under

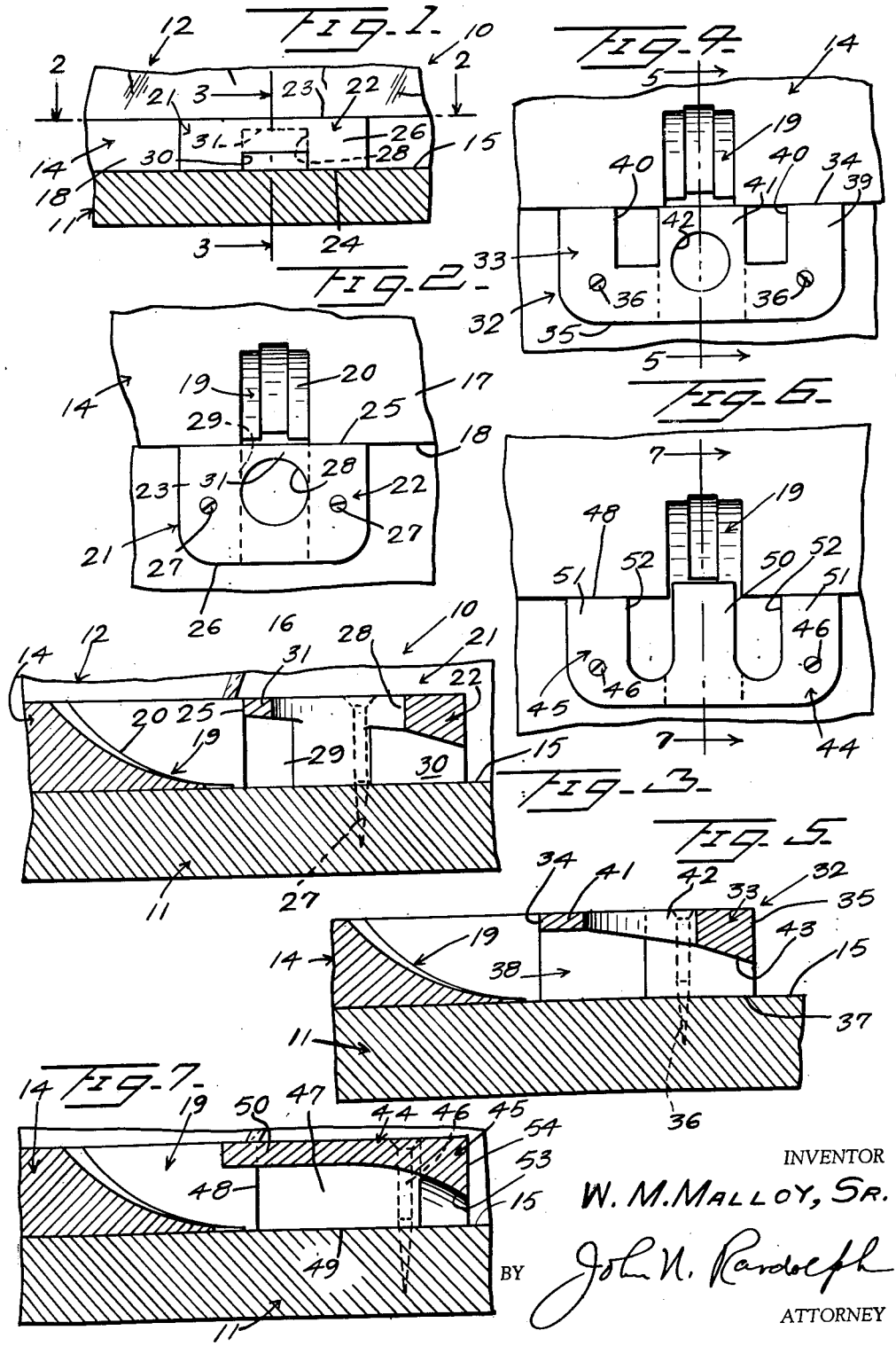

United States Patent Office
3,019,765
Patented Feb. 6, 1962

3,019,765
FEED CONTROL FOR A BIRD FEEDER
William M. Malloy, Sr., Stony Point, N.Y.
Filed Aug. 5, 1960, Ser. No. 47,663
6 Claims. (Cl. 119—52)

This invention relates to a novel attachment for a bird feeder for effectively limiting the amount of feed which is automatically dispensed from a hopper of a feeder for wild birds.

Wild birds will habitually scatter and waste feed which is disepnsed automatically from a bird feeder if any means can be found to accomplish this. Accordingly, it is a primary object of the present invention to provide a feed control which is so constructed that the hopper is completely inaccessible to the birds and so that only feed which has been automatically dispensed into a well of the feed control is accessible to the birds, to thereby effectively prevent waste of the feed.

A further object of the invention is to provide a feed control which is so constructed that the feed can only be obtained from above by an up and down movement of the bird's beak into and out of a well of the control.

Still another object of the invention is to provide a feed control having drainage means for carrying off moisture resulting from precipitation or other causes, to minimize waste of the seed due to spoilage and to maintain the seed, within the control, in a dry, palpable state which will be attractive to wild birds.

Various other objects and advantages of the invention will hereinafter become more fully apparent from the following description of the drawing, illustrating presently preferred embodiments thereof, and wherein:

FIGURE 1 is a fragmentary side elevational view, partly in section, showing a portion of the lower part of a wild bird feeder equipped with one form of the feed control;

FIGURE 2 is a fragmentary horizontal sectional view thereof, taken substantially along a plane as indicated by the line 2—2 of FIGURE 1, and showing the feed control and a portion of the hopper bottom in top plan;

FIGURE 3 is an enlarged vertical sectional view taken substantially along a plane as indicated by the line 3—3 of FIGURE 1;

FIGURE 4 is a view, similar to FIGURE 3, illustrating another form of the feed control;

FIGURE 5 is an enlarged vertical sectional view, taken substantially along a plane as indicated by the line 5—5 of FIGURE 4;

FIGURE 6 is a plan view, similar to FIGURES 2 and 4, illustrating a third form of the feed control, and FIGURE 7 is an enlarged vertical sectional view taken substantially along a plane as indicated by the line 7—7 of FIGURE 6.

Referring more specifically to the drawing, the lower portion of a wild bird feeder, designated generally 10, including a platform 11, is illustrated in FIGURES 1 and 3. A part of the lower portion of a hopper 12 of the feeder 10 is shown in these views, including a portion of the hopper bottom 14 which is disposed on and secured to a central portion of a substantially flat upper surface 15 of the platform 11. A bottom portion of one wall 16 of the hopper 12 is shown extending upwardly from the upper surface 17 of the hopper bottom 14, adjacent an edge 18 thereof. The remainder of the hopper 12 and platform 11, not shown, may correspond with the platform and hopper, respectively, as disclosed in my prior U.S. Patent No. 2,944,516, issued July 12, 1960.

The present invention relates to a novel means for effectively controlling the automatic discharge of feed, not shown, from the hopper 12, to prevent the feed being scattered and thereby wasted by the birds, and also to minimize wastage of feed, due to spoilage. This invention constitutes an improvement on the invention as disclosed in my prior, co-pending application entitled Feed Control for a Bird Feeder, Serial No. 852,540, filed November 12, 1959 and now matured into Patent No. 2,984,209, the present invention providing a more effective means for positively regulating the amount of feed automatically supplied from the hopper 12 and made accessible to the wild birds.

The hopper bottom 14 is shown provided with a recess or groove forming a chute 19 which opens upwardly into the hopper 12, inwardly with respect to the upwardly extending wall 16, and which opens outwardly through the hopper bottom edge 18 onto a portion of the platform 11, beneath said wall 16. The chute 19 is preferably made with a concave bottom 20 which is inclined downwardly and outwardly toward the hopper bottom edge 18, so that the concave curvature of the chute bottom 20 extends in a direction lengthwise thereof.

A feed control, designated generally 21, as illustrated in FIGURES 1, 2 and 3, includes a body portion 22 which functions with the chute 19, a portion of the hopper bottom edge 18 and a portion of the upper surface 15 of the platform. The body member 22 is preferably of a thickness approximately equal to the thickness of the hopper bottom 14 and has a substantially flat top surface 23 and a substantially flat bottom surface 24. The body member 22 has a straight, substantially flat inner longitudinal edge 25, and an outer longitudinal edge 26, which may be rounded at its ends, as seen in FIGURE 2. The bottom surface 24 of the control 21 rests upon a part of the platform top surface 15 and is preferably secured thereto by screw fastenings 27 which extend downwardly through end portions of the body member 22 and which are anchored in the platform 11. The control 21 is positioned on the platform 11 so that the inner longitudinal edge 25 thereof abuts flush against the hopper bottom edge 18, with the intermediate portion thereof extending across the end of the chute 19 which opens through said edge 18.

The body member 22 has an opening 28 extending from top to bottom therethrough and which is located approximately intermediate of the ends thereof and between and spaced from the longitudinal edges 25 and 26, as best seen in FIGURE 2. The bottom of the opening or bore 28 is closed by a part of the platform top surface 15 to form a well. The underside 24 of the body 22 is also recessed, as seen at 29, to provide a feed supply passage which opens into the chute 19 and into the well or bore 28. The underside 24 is also recessed to provide a drainage passage 30 which communicates with and extends from the well 28 and which opens outwardly through the outer longitudinal edge 26.

Assuming that the hopper 12 is filled or partially filled with bird feed, not shown, it will be readily apparent that the feed will flow by gravity through the chute 19 and passage 29 into the well 28, and that the feed already within the well 28 will regulate flow of feed thereto, so that a substantially predetermined amount of feed will be maintained at all times automatically within the well 28, so long as there is feed remaining in the hopper 12, above the chute 19. Wild birds can obtain the feed, thus supplied from the hopper 12, only by inserting their beaks downwardly through the opening in the top surface 23, constituting the upper end of the well 28, and which is not of sufficient size to enable lateral movement of the head to an extent sufficient to scatter the feed contained in said well. Accordingly, feeding birds can only pick up and remove the feed through the open top of the well 28. A portion 31 of the body member 22 which extends across the feed passage 29 and which is located between the open top of the well 28 and the inner longitudinal edge 25, forms a guard bar to prevent a bird from inserting its beak into the chute 19 and scooping the feed out of said chute. Any moisture entering the well 28, due to precipitation or other causes, can drain therefrom through the drainage passage 30, to minimize the waste of feed due to spoilage. The size of the drainage passage 30 may be varied, and it is preferably of a size to minimize escape of feed therefrom and so that a bird cannot reach the feed within the well 28 therethrough.

FIGURES 4 and 5 illustrate a slightly different form of the control, designated generally 32 and including an elongated body member 33 having an inner straight longitudinal edge 34 which abuts the hopper bottom edge 18 and an outer longitudinal edge 35, which may be rounded at its ends. The feed control 32 is secured to the platform 11 by screw fastenings 36 which extend downwardly therethrough, adjacent the ends of the body member 33, and which are anchored in the platform 11 so that substantially flat bottom surface 37 of the body 33 will rest flush on a portion of the platform top surface 15. The body member 33 is provided with a recess 38 which extends throughout a substantial part of the length thereof and which opens through the bottom surface 37 and through the inner longitudinal edge 34. End portions of the recess 38 open upwardly through the top surface 39 of the body 33 to provide access openings 40, which are separated from one another by a top portion 41 which overlies an intermediate portion of the recess 38 and which has a front portion constituting a part of the inner longitudinal edge 34. Said front portion spans the top of the chute 19.

The body member 33 has a bore 42 which opens upwardly through the top thereof and the top part of which is formed partially in said top portion 41. The front portion of the lower part of the bore 42 opens into the recess 38 and the rear portion thereof communicates with the drainage passage 43, formed in the underside 37 and which opens through the outer longitudinal edge 35, approximately midway of the ends of the control 32.

The feed, not shown, is supplied automatically by gravity from the hopper through the chute 19 onto a portion of the top of the platform top surface 15 above which the recess portion 38 of the control is located, and the amount of feed within said recess portion 38 regulates the supply of feed through the chute 19. The access openings 40 and the open top of the well 42 provide three access openings through which birds can insert their beaks for picking up feed contained within the recess 38. The part of the top portion 41, disposed between the top of the well 42 and the chute 19, provides a guard or shield between said well 42, access openings 40 and the chute 19, so that the feeding birds cannot insert their beaks into the chute, either from the well 42 or through the access openings 40, to scoop the feed from the chute. Moisture will drain from the control 32 through the passage 43 to minimize waste due to spoilage.

FIGURES 6 and 7 illustrate a third embodiment of the control, designated generally 44, including a body member 45, mounted in the same manner as the control 32, by fastenings 46, and having a recess 47, similar to the recess 38, which opens through the longitudinal inner edge 48 and the bottom 49 thereof. The recess 47 is somewhat greater in width, as seen in FIGURE 7, than the recess 38, as seen in FIGURE 5. The body member 45 has a top portion 50, similar to the top portion 41, which overlies the intermediate portion of the recess 47. The recess 47 opens upwardly through the top surface 51 of the body member 45 on opposite sides of said top portion 50, to provide two access openings 52. The control 44 differs from the control 32 in that the control 44 is not provided with a well and the top portion 50 has no opening therein and is somewhat longer and narrower than the top portion 41. The width of the top portion 50 is less than the width of the chute 19 and said top portion 50 extends beyond the inner longitudinal edge 48, so as to extend into the top portion of the outer end of the chute 19. The control 44 has a drainage passage 53 which opens into the recess 47, intermediate of the ends thereof, and which opens outwardly through the outer longitudinal edge 54 of the body portion 45, and also through its bottom surface 49.

The feed from the hopper is supplied through the chute 19 by gravity into the recess 47 beneath the top portion 50 and will spread sufficiently within said recess and on the platform top surface 15 to be accessible to the birds through the access openings 52. However, the top portion 50 will maintain the chute 19 inaccessible to the birds so that feed cannot be scooped from said chute. As in the other embodiments, moisture may drain from the control through the passage 53.

Various other modifications and changes are contemplated and may be resorted to, without departing from the function or scope of the invention as hereinafter defined by the appended claims.

I claim as my invention:

1. In combination with a feeder for wild birds including a hopper having a bottom, a platform disposed beneath and secured to an underside of said hopper bottom and having a part extending outwardly from an edge of said bottom, said hopper bottom being of substantial thickness whereby an upper surface thereof is disposed substantially above the level of an upper surface of the platform, said hopper bottom being recessed to provide an automatic feed dispensing chute having an upper end opening into the hopper and a lower discharge end opening outwardly of said edge of the hopper bottom onto a portion of the top surface of the platform; a feed control comprising a body member having a bottom surface resting on a part of the top surface of said platform located outwardly with respect to said edge of the hopper bottom and having an inner edge abutting said edge of the hopper bottom, means securing said body member on the platform, said body member having a recess opening outwardly of a portion of said bottom surface and through a portion of said inner edge, a part of said recess communicating with the discharge end of the chute and through which the chute discharges into the feed control and onto the top surface of said platform, and said body member having a top portion provided with an access opening smaller than the recess and communicating with a part thereof only, and another part of said top portion being disposed between said access opening and the discharge end of the chute to provide a guard or shield between the access opening and chute and located over the first mentioned part of said recess.

2. A feed control as in claim 1, said body member having a recessed part opening through the bottom surface thereof and forming a drainage passage communicating with said recess and opening outwardly of the body member remote from the chute.

3. A feed control as in claim 1, said top portion having additional access openings, spaced from one another and from said first mentioned access opening and opening downwardly therethrough into said recess, said shield or guard being disposed between said last mentioned access openings and the discharge end of the chute.

4. A feed control as in claim 1, said top portion having a second access opening extending therethrough and opening downwardly into said recess, said guard being disposed between said access openings.

5. A feed control as in claim 4, said guard extending beyond said inner edge of the body member and into a top portion of the discharge end of the chute.

6. A feed control as in claim 1, said top portion having a second access opening extending therethrough and opening downwardly into said recess, said guard being disposed between said access openings, and a third access opening extending through said top portion into said recess and spaced from said aforementioned access openings, said guard being disposed between the discharge end of the chute and each of said access openings.

References Cited in the file of this patent

UNITED STATES PATENTS

| | | |
|---|---|---|
| 2,344,367 | Pueschel | Mar. 14, 1944 |
| 2,475,207 | Smith | July 5, 1949 |
| 2,984,209 | Malloy | May 16, 1961 |